(12) United States Patent
Bleicher et al.

(10) Patent No.: US 11,346,733 B2
(45) Date of Patent: May 31, 2022

(54) MEASURING ELEMENT, MEASURING SYSTEM, AND METHOD OF PROVIDING A MEASURING ELEMENT FOR MEASUREMENT FORCES

(71) Applicant: TE Connectivity Germany GmbH, Bensheim (DE)

(72) Inventors: Martin Bleicher, Fichtenau (DE); Christoph Göppel, Bechhoffen A.D.H. (DE); Felix Greiner, Griesheim (DE); Daniel Leiminger, Marktoffingen (DE); Stefan Raab, Nordlingen (DE)

(73) Assignee: TE Connectivity Germany GmbH, Bensheim (DE)

( * ) Notice: Subject to any disclaimer, the term of this patent is extended or adjusted under 35 U.S.C. 154(b) by 305 days.

(21) Appl. No.: 16/456,012

(22) Filed: Jun. 28, 2019

(65) Prior Publication Data

US 2019/0316977 A1    Oct. 17, 2019

Related U.S. Application Data

(63) Continuation of application No. PCT/EP2017/084791, filed on Dec. 29, 2017.

(30) Foreign Application Priority Data

Dec. 29, 2016 (DE) .................. 10 2016 226 282.3

(51) Int. Cl.
*G01L 5/00* (2006.01)
*G01L 1/04* (2006.01)

(52) U.S. Cl.
CPC .............. *G01L 5/0057* (2013.01); *G01L 1/04* (2013.01)

(58) Field of Classification Search
CPC ................................ G01L 5/0057; G01L 1/04
See application file for complete search history.

(56) References Cited

U.S. PATENT DOCUMENTS

| 2,316,975 A | 4/1943 | Ruge |
| 2,419,061 A | 4/1947 | Emery |

(Continued)

FOREIGN PATENT DOCUMENTS

| DE | 25 56 836 A1 | 12/1976 |
| DE | 10 2011 054 319 A1 | 4/2013 |

(Continued)

OTHER PUBLICATIONS

Examination Report, Government of India, dated Dec. 18, 2020, 6 pages.

(Continued)

*Primary Examiner* — Max H Noori
(74) *Attorney, Agent, or Firm* — Barley Snyder

(57) ABSTRACT

A measuring element for registering forces includes a first measuring arm extending in a longitudinal direction of the measuring element, a second measuring arm extending in the longitudinal direction, a deformation section connecting the first measuring arm and the second measuring arm to one another in an elastically deformable manner, and a transformer unit arranged on a first side or a second side of the deformation section. The first measuring arm and the second measuring arm can be deflected relative to one another in a direction perpendicular to the longitudinal direction. The transformer unit responds to deformation and is situated fully within the deformation section.

40 Claims, 6 Drawing Sheets

(56) References Cited

U.S. PATENT DOCUMENTS

| | | | |
|---|---|---|---|
| 2,666,262 A | | 1/1954 | Ruge |
| 2,815,424 A | | 12/1957 | Giles |
| 2,927,458 A | | 3/1960 | Moon, Jr. et al. |
| 4,019,377 A | | 4/1977 | Rickards |
| 4,251,918 A | * | 2/1981 | Duggan .................. G01B 7/18 33/790 |
| 4,744,709 A | * | 5/1988 | Hertel ............... H01L 21/67288 177/211 |
| 6,616,667 B1 | * | 9/2003 | Steiger ............... A61B 17/8861 606/103 |
| 2009/0260473 A1 | * | 10/2009 | Gosselin .................. B25J 17/00 74/490.05 |
| 2014/0224037 A1 | * | 8/2014 | Shimoyama ............ G01L 5/166 73/862.045 |

FOREIGN PATENT DOCUMENTS

| | | |
|---|---|---|
| JP | S5514578 U | 1/1980 |
| JP | 2011107039 A | 6/2011 |
| WO | 2013050304 A1 | 4/2013 |

OTHER PUBLICATIONS

The Second Office Action and English translation, China National Intellectual Property Administration, dated Dec. 7, 2020, 8 pages.
PCT Notification, The International Search Report and The Written Opinion of the International Searching Authority, International Appl. No. PCT/EP2017/084791, dated Feb. 9, 2018, 15 pages.
Abstract of JP2011107039, dated Jun. 2, 2011, 1 page.
Abstract of DE 25 56 836, dated Dec. 9, 1976, 1 page.

* cited by examiner

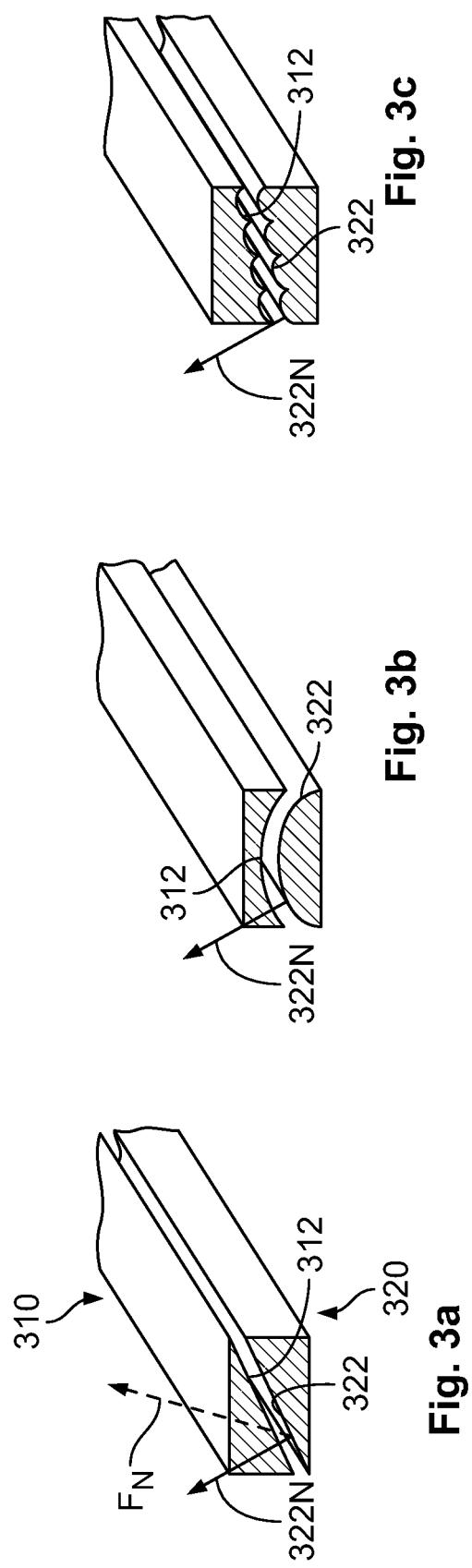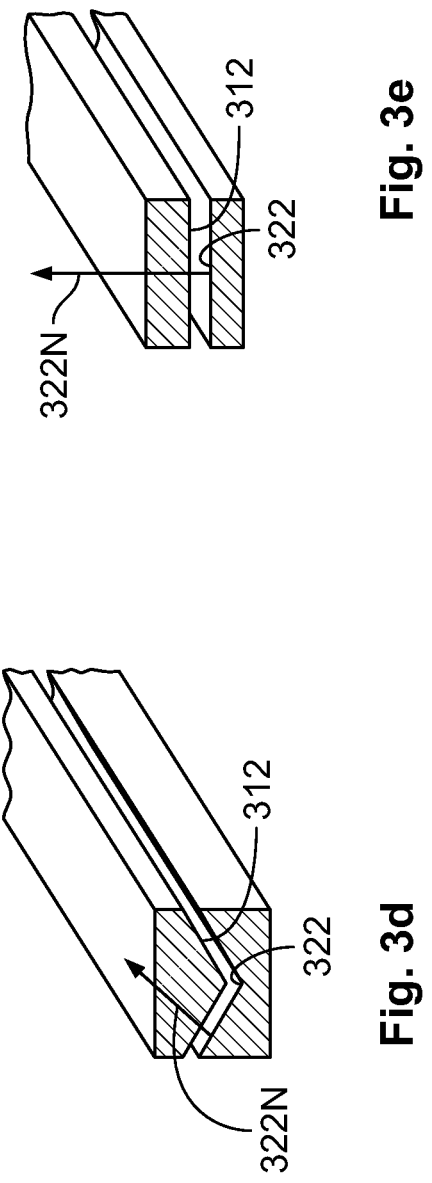

MEASURING ELEMENT, MEASURING SYSTEM, AND METHOD OF PROVIDING A MEASURING ELEMENT FOR MEASUREMENT FORCES

CROSS-REFERENCE TO RELATED APPLICATIONS

This application is a continuation of PCT International Application No. PCT/EP2017/084791, filed on Dec. 29, 2017, which claims priority under 35 U.S.C. § 119 to German Patent Application No. 102016226282.3, filed on Dec. 29, 2016.

FIELD OF THE INVENTION

The present invention relates to a measuring element and, more particularly, to a measuring element for measuring forces

BACKGROUND

The measurement of relatively small forces, which typically act perpendicularly onto a material, is in many technical fields an important issue in order to be able to make appropriate statements regarding the material point concerned and/or the component exerting the force. An important field of application in this respect is the ascertaining of contact forces in many types of connections, for instance plug connections, in which an electrical and mechanical contact is typically produced by a contact pin or the like being loaded with a substantially perpendicularly-acting force which is generated by a complementary contact element. The elastic force which arises thereby has the function of producing and maintaining a reliable electrical contact between the two surfaces which are in contact. The contact force applied thereby should be both sufficiently large in order to produce, at the envisaged position, a relatively planar contact between the two contact surfaces and thereby to remove possible impurities, deposits and the like, so that a contact with as low a resistance as possible is formed. On the other hand, the contact force applied should not be too large, because in that case relatively large forces are required during the deflection of the component exerting the contact force and in particular excessive wear on the contact surfaces can also occur in the event of repeated plugging-together and decoupling of the corresponding components. However, a minimal contact force must be upheld in order to repeatedly provide the desired electrical and mechanical connection during the entire duration of the contact.

In order to therefore ascertain and also monitor the corresponding occurring contact forces, measuring elements or measuring transformers are employed which, for example, take over the role of a contact element, for instance a plug, and which are connected to the complementary plug device which is to be examined. In some known systems as described by way of example in German Patent Application No. DE 10 2011 054 319 A1, a measuring arm is used which, at given positions which come into contact with the complementary component, is equipped with a measuring cell which can output a corresponding signal when loaded with a force. In other words, in these known systems, the measuring cell which is provided for example in the form of a piezoresistive material or the like, is located precisely at the point at which a contact with the surface of the complementary component is produced, meaning that a more or less direct registering of the resulting normal force is possible. A relatively exact correspondence between the registered force and the forces actually occurring between a plug connection arises only if the entire structure of the measuring arm, including the measuring cell, is modelled as identically as possible on the geometry of the corresponding point in the component to be examined, because otherwise in the event of diverging geometry there arises a force which does not correspond to the actual conditions. Furthermore, the direct contact between the measuring cell and the complementary region of the plug connection can lead to increased wear on the measuring cell, particularly if frequent measurements are carried out in order to economically exploit the measuring system efficiently. In order to keep the degree of wear low, a suitable coating is typically applied in order to increase the mechanical strength of the measuring cell. However, through the application of an appropriate mechanical or more robust coating the response sensitivity of the measuring cell and thus the exactness and the resolution of the measurement results obtained is possibly reduced.

In other known measuring systems, an "indirect" registering of the forces is carried out by a suitably formed pair of measuring arms that, in terms of their geometry and material characteristics, can be modelled to a large extent on the actual conditions. The measuring arms enable a relative deflection relative to one another which is then detected at a suitable point of the measuring system. German Patent No. DE 25 56 836, for example, describes a measuring element and a measuring head for measuring small forces, in particular contact spring forces, wherein the measuring element consists of a one-piece plate which has two legs formed by slots that are connected to one another via a short web. On the short web and at the adjacent rigid regions there is formed a strain gauge from which one part is thus deformed by the spring force exerted onto the legs due to the deformation of the short web and thus can output a signal which is proportional to this deformation. Due to the two legs which are separated by a slot, the connecting web is for instance of the size of the slot and the strain gauge has an extent which is substantially greater than the web connecting the two legs.

The conventional systems described above permit an efficient ascertainment of spring forces in a correspondingly limited measurement range, but with the response sensitivity and the resolution and measurement exactness possibly being relatively low in the "directly" measuring system due to the structure of the measuring cell and, in the event of frequently repeated measurement, there occurring, due to the unavoidable wear, a change in the overall geometry of the measuring cell which may not be noticed for a long time and which in turn has an influence on the forces ascertained.

The previously described "indirectly" measuring concept does allow a relative exact modelling of the actual conditions in the region of the measuring arms, i.e. the coupling between the corresponding plug connection can be modelled relatively realistically, but reduced measurement exactness must be expected due to the geometric configuration and the relatively long strain gauge.

SUMMARY

A measuring element for registering forces comprises a first measuring arm extending in a longitudinal direction of the measuring element, a second measuring arm extending in the longitudinal direction, a deformation section connecting the first measuring arm and the second measuring arm to one another in an elastically deformable manner, and a transformer unit arranged on a first side or a second side of the deformation section. The first measuring arm and the second measuring arm can be deflected relative to one another in a direction perpendicular to the longitudinal direction. The transformer unit responds to deformation and is situated fully within the deformation section.

BRIEF DESCRIPTION OF THE DRAWINGS

The invention will now be described by way of example with reference to the accompanying Figures, of which:

FIG. 3A is a sectional perspective view of a pair of measuring arms according to an embodiment;

FIG. 3B is a sectional perspective view of a pair of measuring arms according to another embodiment;

FIG. 3C is a sectional perspective view of a pair of measuring arms according to another embodiment;

FIG. 3 D is a sectional perspective view of a pair of measuring arms according to another embodiment;

FIG. 3D is a sectional perspective view of a pair of measuring arms according to another embodiment;

DETAILED DESCRIPTION OF THE EMBODIMENT(S)

Figure 1A:
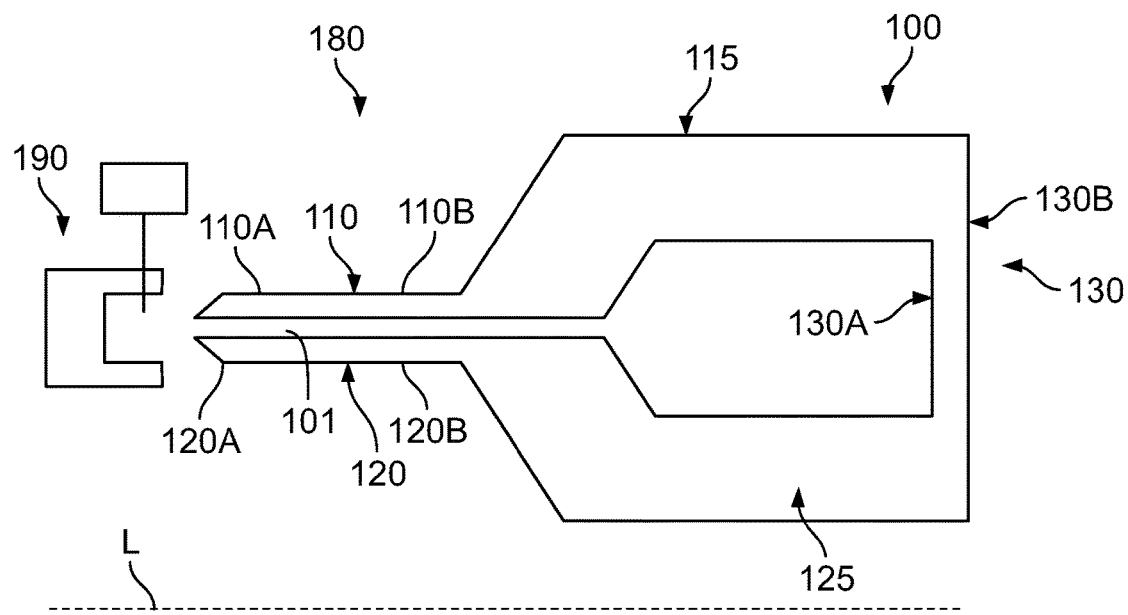
FIG. 1A is a side view of a measuring system according to an embodiment.

Embodiments of the present invention will be described hereinafter in detail with reference to the attached drawings, wherein like reference numerals refer to like elements. The present invention may, however, be embodied in many different forms and should not be construed as being limited to the embodiments set forth herein; rather, these embodiments are provided so that the disclosure will convey the concept of the invention to those skilled in the art.

A measuring system 180 according to an embodiment for measuring forces, in particular forces in the range of a few centinewtons up to some hundreds of Newtons, is shown in FIG. 1A. A component of a respective force, which is oriented perpendicular to a longitudinal direction L of the system 180 and which is situated in the plane of projection of FIG. 1A, is registered. In practice, such forces can possibly act onto the system 180 at a certain angle, with that corresponding component of this force which is situated in the plane of projection of FIG. 1A and oriented perpendicular to longitudinal direction L is measured. However, a small angular deviation regarding the previously ascertained force direction can occur due to a slight deflection or deformation in the measuring system 180.

The system 180, as shown in FIG. 1A, comprises a calibration unit 190 which serves to exert a given known force at the system 180 at a precisely specified position, as is also explained in greater detail below. The system 180 further comprises a measuring element 100 which is the component of the system 180 which is loaded with a force which is to be measured and provides a signal corresponding to this force.

The measuring element 100, as shown in FIG. 1A, comprises a first measuring arm 110 and a second measuring arm 120, which in the unstressed state form therebetween a spacing 101 which, depending on the application, can have a size from some tenths of a millimeter up to a millimeter or more. The first measuring arm 110, which has a front region 110A and a rear region 110B, and the second measuring arm 120, which similarly has a front region 120A and a rear region 120B, are mechanically coupled to one another via a deformation section 130, so that a relative deflection of the measuring arms 110, 120 relative to one another, which leads to a change in the spacing 101, causes an elastic deformation of the section 130. The deformation of the section 130 is transformed into a signal; for the sake of simplicity, the device for transforming the deformation into a signal is not shown in FIG. 1A.

In the embodiment shown in FIG. 1A, the measuring arms 110, 120 are connected by corresponding legs or transition regions 115, 125 to the deformation section 130. The transition regions 115, 125 are typically configured such that they show a merely negligible deformation when they are loaded with a force which has the previously described orientation. In other words, the geometric arrangement made up of the measuring arms 110, 120, the transition regions 115, 125 and the deformation section 130 is structured such that, when a relative deflection of the measuring arms 110, 120 takes place, a noticeable deformation occurs only in the deformation section 130 and, as described below, to a certain extent at the measuring arms 110, 120 too. It should be noted that, when the measuring arms 110, 120 are in the "unstressed" state, small forces can nevertheless exert an effect on the measuring arms 110, 120, but these cause substantially no noticeable deformation, in particular in section 130. For example, in the depicted orientation, gravity can act downwards perpendicularly to the longitudinal direction L and this force leads to no measurable deformation, even if only a part of the measuring element 100 is rigidly connected to an additional body, for instance a housing (not shown).

As shown in FIG. 1A, the deformation section 130 has in particular a pronounced length in the direction perpendicular to longitudinal direction L, so that, depending on the material and geometry, the deformation section 130 can register a desired response sensitivity even in the case of small deflection of the measuring arms 110, 120. For this purpose, one or more transformer units which are formed to transform a deformation of the section 130 into a signal are attached at given positions, for instance on a side 130A facing the measuring arms 110, 120 and/or on a side 130B facing away from the measuring arms 110, 120. It should furthermore be noted that, alongside the material characteristics, a "height" or material wall strength, i.e. the dimensions of the material in a direction perpendicular to the plane of projection from FIG. 1A, in particular of the deformation section 130 also has a significant influence on the deformation characteristics of the section 130 and therefore is also taken into account when selecting the geometric design of the deformation section 130.

Figures 1B, 1C, 1D:
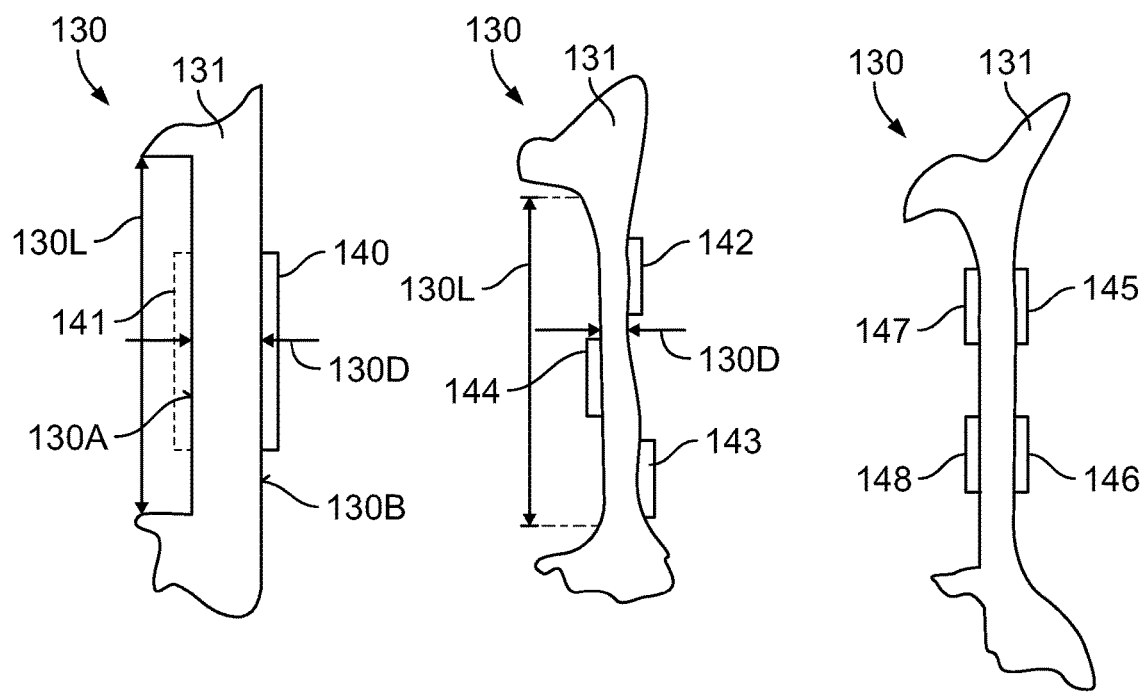
FIG. 1B is a side view of a deformation section of the measuring system of FIG. 1A.
FIG. 1C is a side view of another deformation section of the measuring system of FIG. 1A.
FIG. 1D is a side view of another deformation section of the measuring system of FIG. 1A.

The deformation section 130, as shown in FIG. 1B, has a geometric design adapted to the respective application such that a desired degree of response sensitivity, exactness and resolution is achieved for the deformation brought about by a deflection of the measuring arms 110, 120. In the shown embodiment, the deformation section 130 substantially corresponds to a more or less rectangular section with relatively sharp edges 131, i.e. with a corresponding transition to the connection regions 115, 125 so that a correspondingly exactly defined length 130L can be specified which corresponds to the spacing of the sharp edges 131. Depending on the application and other material characteristics and the wall thickness of the section 130, the length 130L can be in the region of 5 mm to 20 mm or greater. The length 130L is in this case selected here such that at least one transformer unit can be fully arranged thereon.

The geometric design of the deformation section 130 is ascertained starting from the material characteristics, i.e. modulus of elasticity, wall thickness, and the like, on the basis of a simulation calculation, in which a fictive deformation section is constructed on the basis of a suitably selected number of finite elements and the mechanical behavior in the event of bending forces occurring is ascertained. The bending forces entering into the calculation can be ascertained in this case on the basis of the geometric design of the measuring element 100, for example if it is assumed that at a given length along the longitudinal direction L a certain range of forces acts onto the measuring arms and are ultimately transmitted via the transition regions onto the deformation section 130. In this manner, significant dimensions, for instance the length 130L or a width 130D of the section 130 can be ascertained in the case of given material wall strength and the known material characteristics. In other words, in contrast to conventional measuring systems, the geometric design of the deformation section 130 is here firstly ascertained by calculation depending on the other factors and in particular the material characteristics for a given wall thickness, such that a desired mode of operation of the measuring systems 180 is guaranteed over a given range of forces exerting an effect. Furthermore, when performing such simulation calculations, it is also possible for corresponding regions with the locally highest deformation to be ascertained in the event of given force acting onto the measuring arms 110, 120 and to be ascertained as suitable positions, i.e. location and expansiveness for corresponding measuring transformers. In this manner, when producing the measuring element 100, it is possible to perform optimized adaptation to the desired application and in particular to the range of forces which occurs. Compared to conventional systems, the response sensitivity and/or the resolution and/or the exactness and thus also the reproducibility are improved. In this manner, it is for example possible to carry out, with the measuring system 180 on the basis of an appropriately configured deformation section 130, a measuring system analysis in which exactness, correctness, systematic measurement deviation, repeatability, reproducibility and the like can be examined and evaluated systematically. In this manner, it is also possible to obtain, in a correspondingly systematic manner, statements on measurement objects which are measured by the measuring system 180.

On the basis of the corresponding simulation calculations, for example the position, i.e. the situation, for instance the situation of a mid point, and the dimensions of a transformer unit 140, are determined in order to thus obtain a desired degree of resolution, exactness, response sensitivity, and the like. For example, in the embodiment shown in FIG. 1B, the transformer unit 140 is provided fully at the central location within the extent 130L of the deformation section 130, because the greatest values of the deformation have been calculated there. In other words, the transformer unit 140 is arranged fully within the deformation section 130, on its facing-away side 130B. Alternatively or additionally, a further transformer unit 141 with suitable dimensions can be arranged on the facing side 130A, wherein here too the exact situation and dimensions of the transformer unit 141 are given by the simulation calculation.

In the embodiment of FIG. 1C, a geometric design of the deformation section 130 differs from the design in FIG. 1B, for instance in terms of the length 130L and/or the representative width 130D which is, for instance, measured in the middle of the length 130L. As has already been explained previously, the material wall thickness of the section 130 is taken into account in this case, with it being assumed here, for the sake of simplicity, that the material thickness is identical for the respective different geometric designs. The geometric design of the section 130, in which the form of the edges 131 can be different compared to the relatively sharp edges 131 in FIG. 1B, is here too again firstly determined through simulation, with suitable positions for several transformer units also having been ascertained. In the shown embodiment, transformer units 142 and 143, for example, are arranged on the facing-away side fully within the region of the length 130L of the section 130 and are thereby situated on outer regions, and a further transformer unit 144 is provided in a central region on the facing side of the section 130. It should be noted, that when calculating the deformation behaviors of the section 130 it is in particular also possible to take into account the mechanical behavior of the one or more transformer units which are thus also encompassed in the "material characteristics" and the "material thickness or wall thickness" of the deformation section 130.

At least one transformer unit is fixed in its position, including its dimensions, such that it covers a region of maximum deformation, while other transformer units are arranged such that they are provided at least in the region of a local maximum of the deformation. Such an approach can, for example, be advantageous for increasing the response sensitivity and also the exactness. For example, in the embodiment of FIG. 1B, the transformer unit 144 can be situated at a location of a globally maximum deformation, while the transformer units 142 and 143 can be arranged at positions with locally maximum deformation. In other embodiments, the transformer units can be appropriately arranged without taking into account the global or local maximum of deformation such that, in interaction, an optimized signal is obtained for the elicited deformation in the section 130.

In another geometric design of the deformation section 130 shown in FIG. 1D, transformer units 145, 147 are provided at opposite positions in the proximity of an edge region of the section 130 and similarly transformer units 146, 148 are provided at opposite positions at the opposite edge region of the region 130. It is the case here too that the precise geometric design of the section 130, i.e. its length, its width, the form of the edges, and the like, with given material characteristics and material thickness, including the characteristics of the transformer units for instance, are ascertained through simulation and the corresponding positions of the transformer units 145, . . . , 148 can also be suitably obtained through simulation.

It should be noted that on the basis of the computed geometric design and the computed positions of the one or more transformer units, which are situated fully within the deformation sections 130 in these embodiments, are then modelled when producing the actual measuring elements, wherein, through the available manufacturing techniques, only small deviations occur between the theoretically ascertained geometric design and the actually implemented geometric design. In other words, typical deviations from the theoretical target value to the practical modelled actual value of the dimensions are, for example, in the region of 1 µm to a few micrometers.

Figure 2A:
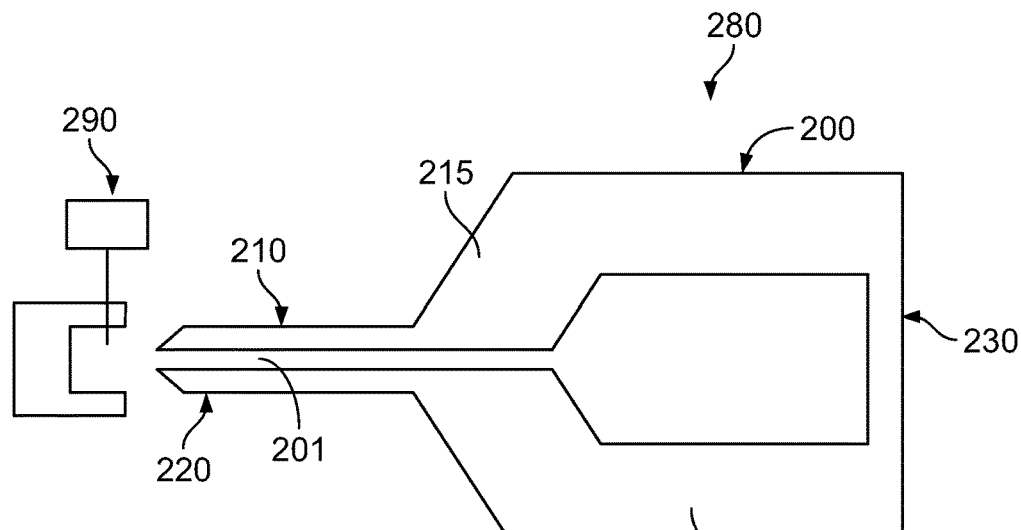
FIG. 2A is a side view of a measuring system according to another embodiment.

A measuring system 280 according to another embodiment is shown in FIG. 2A. The system 280 has a measuring element 200 and a calibration unit 290. The measuring element 200 comprises a first measuring arm 210 and a second measuring arm 220, which, in the unstressed state, are separated from one another by a spacing 201. Furthermore, the first measuring arm 210 and the second measuring arm 220 are coupled to a deformation section 230 via corresponding connection regions 215, 225, with one or more measuring transformers, which for the sake of simplicity are not shown in FIG. 2A, being attached to the deformation section 230. In embodiments, the corresponding measuring transformer units can be arranged as shown and described in connection with the system 180 in FIGS. 1B-1D. It should however be noted that a corresponding positioning of one or more measuring transformer units can take place on the basis of simulation calculations as is described previously for example, in other embodiments only a suitable geometry, which can be ascertained by experiments or the like or also by simulation, is sufficient and can be applied as a basis for the measuring element 200. In other words, in embodiments, the geometric design of the deformation section 230 in particular is ascertained on the basis of simulation calculations, but in other embodiments this is not required and corresponding experimental results and other expert knowledge may be sufficient to configure the measuring element 200 for a desired area of application. The measuring element 200 is in particular designed for a broadened measurement range by being able to assume different mechanical states which correspond to different measurement ranges for the forces to be measured.

Figure 2B:
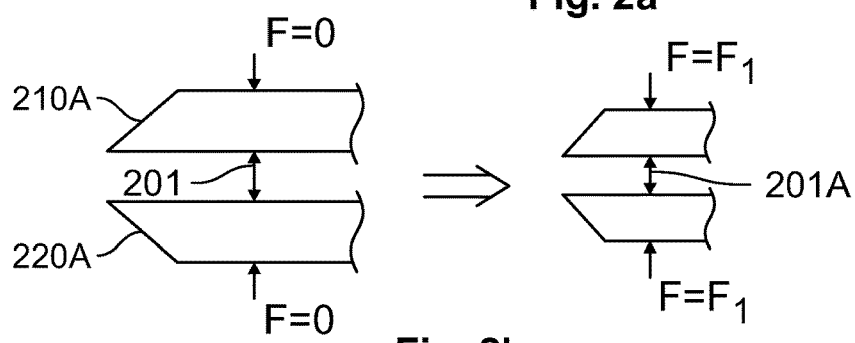
FIG. 2B is a schematic view of a first mechanical state of a measuring element of the measuring system of FIG. 2A.

As shown in FIG. 2B, a front region 210A of the first measuring arm 210 and a front region 220A of the second measuring arm 220 are shown in the unstressed state, meaning that the spacing 201 is maintained there. When loaded with a force, the value 0 is however smaller than a first threshold, for example a force of several tens of Newtons, a relative deflection of the two measuring arms 210, 220 takes place, i.e. in particular the two front regions 210A, 220A, so that a new spacing 201A is adjusted which is representative of the exerted force F1. It should be noted that the relative deflection can take place without appreciable elastic deformation of the two measuring arms 210, 220 if they possess sufficient rigidity for the force F1 which is exerting an effect. If the force F1 increases, a further reduction of the spacing 201A takes place and the region in which the spacing 201A is not 0, i.e. as long as there is no direct mechanical contact between the two front regions 210A, 220A, is referred to as a first measurement range.

Figure 2C:
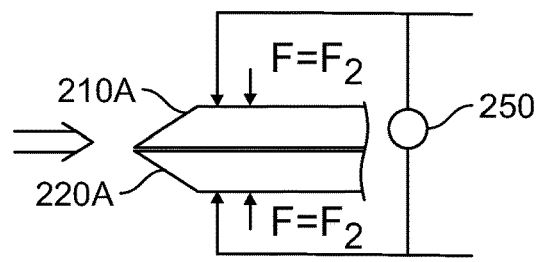
FIG. 2C is a schematic view of a second mechanical state of the measuring element of the measuring system of FIG. 2A.

A further mechanical state of the measuring element 200 is shown in FIG. 2C in which a force or pair of forces F2 exerts an effect on the two measuring arms 210, 220 so that they come into direct contact with one another. In this case, the force F2 at which a mechanical contact just occurs between the two front regions 210A 220A is referred to as a threshold. In other words, from the time of a direct contact between the two front regions 210A, 220A of the measuring arms, it is possible that no additional, or a significantly reduced, deflection will occur at the deformation section 230, and possibly only a certain elastic deformation of the measuring arms 210, 220 will take place, so that the contact surface between the first front region 210A and the second front region 220A grows larger. The mechanical contact between the regions 210A, 220A can be suitably detected, for which purpose a suitable detecting unit 250 is provided.

The schematically depicted detecting unit 250, shown in FIG. 2C, can be suitably formed here to register an electrical resistance between the front regions 210A, 220A, which resistance changes for example when the measuring arms 210, 220 overall are constructed from a material with relatively high electrical resistance. In other words, in this case, in the event of there being no contact, an infinite resistance would be measured at an insulator or a relatively large resistance would be measured if the flow of current is taking place via the measuring arms 210, 220, the transition regions and the deformation section 230. On the other hand, if there is a direct contact, the resistance is decreased correspondingly through the parallel connection of the "contact resistance", such that this permits a corresponding registering of the direct contact. Furthermore, the increase in the contact surface can contribute to a further measurable reduction of the resistance, meaning that a corresponding representative signal is obtained for the force F2.

In other design variants, the detecting device 250 can additionally or alternatively implement other measuring concepts, for instance a capacitive measurement, an inductive measurement, and the like, in order to obtain a corresponding output signal. Furthermore, as an alternative or in addition to the electrical evaluation of the direct contact, one or more pressure-sensitive sensors may be provided, which then output a signal which is dependent upon the force F2. It must be noted here that an appropriate mechanical stressing of such sensors is relatively low, because a stressing only occurs in a direction perpendicular to the longitudinal direction and also only when the corresponding threshold force which limits the first measurement range is exceeded.

Figure 2D:
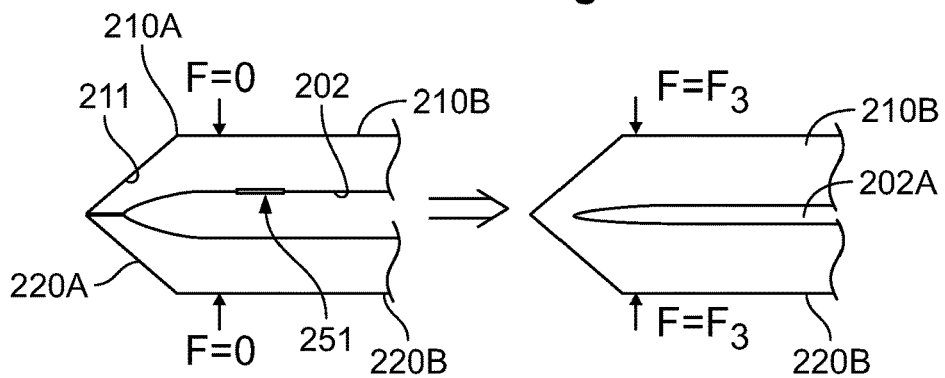
FIG. 2D is a schematic view of a third mechanical state of the measuring element of the measuring system of FIG. 2A.

A further mechanical state is shown in FIG. 2D in which a further rise in the force acting on the measuring arms 210, 220 does not lead to any further increase in the contact surface 211 between the front regions 210A and 220A, which means that, starting from a particular second threshold force, the size of an intermediate space 202 formed substantially by a rear region 210B of the first measuring arm and a rear region 220B of the second measuring arm is changed. When a force which is above the second threshold, here referred to as F3, exerts an effect, then a deformation or reduction of the intermediate space takes place so that a reduced size 202A, for example, arises. In order to register the size or form and their change from the intermediate space 202 into the intermediate space 202A, there is provided a suitable further detecting device 251 which outputs a signal that is a measure of the size of the intermediate space 202, 202A for example. The detecting device 251 can in this case have any suitable sensors, for instance strain gauges, piezo-electrical elements, electrical components for the inductive and/or capacitive measurement and the like, which means that a third measurement range for larger forces can be provided. The deformation section 230 possibly suffers no further appreciable deformation and thus cannot significantly contribute to the characterization of the occurring forces, but the information obtained by the detecting units 250 and/or 251 enable a further-reaching evaluation of the occurring forces. In this manner, a single structure enables a very large range of forces to be covered, wherein, due to the characteristics of the deformation section 230, a large degree of response sensitivity and resolution is achievable, in particular in the first measurement range characterized by the mechanical state from FIG. 2B.

In another embodiment, the measuring element 200 shown in FIG. 2D is a measuring element in which the measuring arms 210, 220 are firmly connected to one another mechanically at their front regions 210A, 210B, which means that a force exerting an effect directly onto the regions which are firmly connected to one another causes no appreciable deformation or change to the intermediate space 202. On the other hand, the rear regions 210B, 220B react to the force to be measured, as is also already the case in the previous embodiments shown in connection with FIG. 2D. The detecting device 251 thus registers the size of the intermediate space 202, for instance by registering the deformation of the rear regions 210B, 220B and/or by registering the spacing of a specified region of the rear region 210B, 220B, for which purpose there are a number of suitable measuring concepts available, which have already been listed previously.

In these embodiments, the inseparable front regions 210A, 220A give rise to a great rigidity which makes it possible to accommodate very large forces. The robust mechanical structure additionally allows a very small total thickness for a given force which is to be measured.

In some embodiments, for the purpose of mechanical stabilization, the measuring arms 210, 220 are suitably mechanically coupled on the side facing away from the front regions 210A, 220A, for instance pressed together, as schematically shown on the left side, or connected to one another by adhesive bonding, as is shown schematically on the right side of FIG. 2D, such that forces exerting an effect there have no significant effect on the size of the intermediate space 202. In other embodiments, the measuring arms 210, 220 are coupled to one another by an elastic deformation section, for instance in the form of the deformation section 230, which is formed such that a certain deformation of the section 230 is caused if the intermediate space is changed. A suitable geometric design for this can be ascertained by experimentation and in particular by simulation. Transformer units can also be provided for such a suitably designed deformation section, these transformer units being able to be used in addition or alternative to the detecting device 251, in order to ascertain the force which is to be measured.

The concept, implemented in the measuring system 280, of the two or more different mechanical states for implementing two or more measurement ranges can in the same way also be implemented in the measuring system 180, i.e. in the measuring element 100, in addition to the concepts described there. Furthermore, the previously described embodiment with firmly or rigidly connected front regions 210A, 220A can likewise be combined with features described previously or below.

FIGS. 3A-3E show front regions of measuring arms which can be used in the previously described measuring elements 100, 200, for example, and also in measuring elements described below.

FIG. 3A shows a first measuring arm 310 and a second measuring arm 320. Surfaces 312 and 322 which are correspondingly facing one another are designed such that they are complementary to one another, i.e. such that they have a certain form fit when they lie on one another, and such that at least regions of the surface have a surface normal 322N, which make an angle with a force component FN which is to be measured. In the embodiment shown in FIG. 3A, the surfaces 312 and 322 have substantially smooth faces that correspondingly form an angle of more than 10 degrees and, in another embodiment, of 30 degrees or more, to the direction of the force component FN which is to be measured.

In an embodiment shown in FIG. 3B, the surfaces 312 and 322 are formed as complementary curved faces, so that here too the surface normal 322N forms, in the significant regions of the curve form, a more or less large angle to the force component which is to be measured.

In an embodiment shown in FIG. 3C, the facing and complementary surfaces 312, 322 have several curved sections, which means that, in this case too, there are many face regions with a surface normal 322N, which form an angle to the force which is to be measured.

In an embodiment shown in FIG. 3D, the surfaces 321, 322 are formed as wedge shapes, so that here too the surface normals 322N form an angle to the direction of the force component which is to be measured.

The facing surfaces 312, 322, which are formed complementary to one another and have the characteristic of forming, at least in regions, an angle between the respective surface normal and the direction of the force component, lead to an overall more rigid behavior of the first and of the second measuring arm 310, 320, as a result of which a more robust mechanical behavior can be achieved.

In an embodiment shown in FIG. 3E, the surfaces are oriented in the direction of the deflection, such that the normal 322N points in the direction of the force which is to be measured.

Figure 4A:
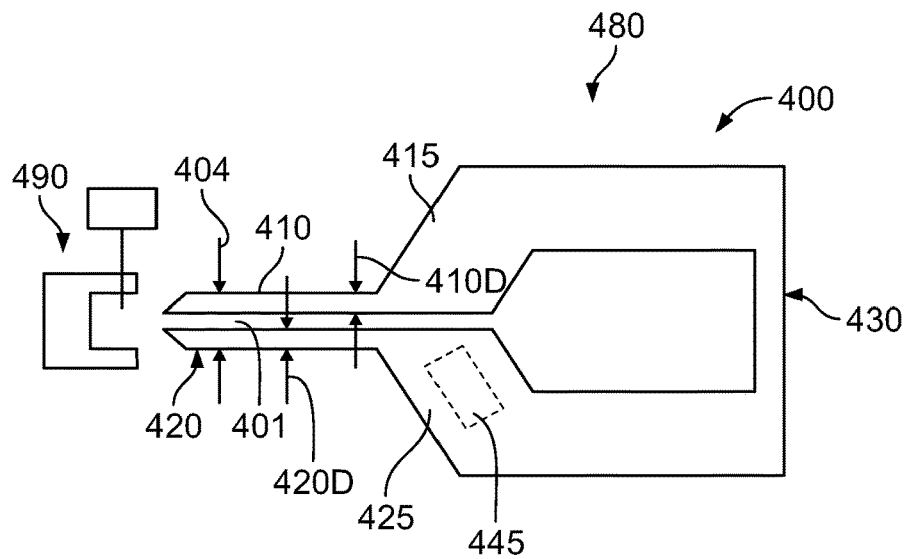
FIG. 4A is a side view of a measuring system according to another embodiment.

A measuring system 480 according to another embodiment is shown in FIG. 4A with a calibration unit 490 and a measuring element 400. A total thickness of a first measuring arm 410 and of a second measuring arm 420 is varied, or can be varied, at least in regions. The characteristics of a varied or variable total thickness of a part of or of the entire measuring arms 410, 420 of the measuring element 400 can also be installed in each of the previously described measuring elements 100, 200 or also in measuring elements described below in addition to the otherwise described characteristics. In other embodiments, none or only isolated characteristics of the measuring elements 100, 200 are implemented in the measuring element 400. In the unstressed state, the first measuring arm 410 and the second measuring arm 420 have a spacing 401 which can be located in a suitable range. The spacing 401 in conjunction with the relevant "thickness" 410D of the first measuring arm and the "thickness" 420D of the second measuring arm gives rise to a total thickness 404 in the unstressed state. The thicknesses 410D, 420D therefore correspond to dimensions of the measuring arms in a direction which also corresponds to the direction of the force component to be measured and which is oriented perpendicularly to the longitudinal direction L. In an embodiment, the thicknesses vary along the measuring arms 410, 420 in the range of +/−200 μm.

The first measuring arm 410 and the second measuring arm 420, as also already described in the preceding measuring elements, are connected by corresponding transition regions 415, 425 to a deformation section 430, which, in the event of relative deflection of the measuring arms, displays a deformation that is transformed into a signal by one or more appropriately arranged transformer units. The appropriate transformer unit can be attached, at any position, to the deformation section 430 as, for example, strain gauges, piezo-electrical components, and the like. In other embodiments, the positioning of the one or more transformer units can, as explained previously, take place as explained in connection with the measuring element 100, for example.

The cross-sections of the measuring arms 410, 420 can be designed as described in connection with FIGS. 3A-3D. In this case, the corresponding thicknesses 410D, 420D are possibly variable and a corresponding representative value at a given position is assumed as a measuring point for the corresponding thickness 410D, 420D. However, it should be noted that the design of the measuring arm surfaces which face one another is of no significance to the total thickness 404. In the depicted embodiment, in the unstressed state, there are provided regions with a variable total thickness 404, which means that different measurement results can possibly be ascertained depending on the angle of attack of the force which is to be measured along the longitudinal direction of the measuring arms 410, 420, because the total thickness also influences the mechanical interaction between the attacking force and the measuring arms 410, 420.

Figure 4B:
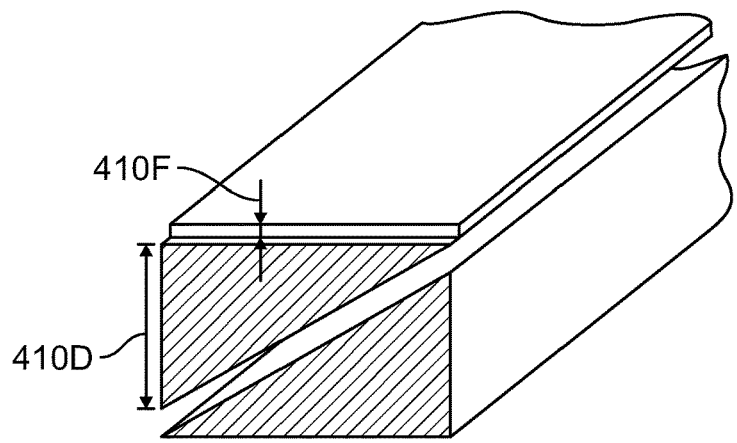
FIG. 4B is a sectional perspective view of a pair of measuring arms of the measuring system of FIG. 4A.

As shown in FIG. 4B, the total thickness 404 is increased in a section by providing an additional thickness 410F. For example, one or more material layers, for example material foils, are applied onto the specified section of the first measuring arm 410. In the depicted section the original or minimum thickness 410D is correspondingly increased by the thickness 410F. A further thickness which is greater than the original thickness 410D but smaller than the thickness 410F can accordingly be installed in another section (not shown) by applying a thinner material layer or a smaller number of identical material layers. In this manner, a section with minimum thickness corresponding to the thickness 410D, a section with a "nominal" thickness and a section with a maximum thickness, i.e. 410D plus 410F, could be installed in order to implement three different total thicknesses 404. A corresponding varying of the thickness can additionally or alternatively be carried out at the second measuring arm 420 and that two regions or four or more regions of different thickness can be installed along the longitudinal extent of the measuring arms 410, 420. If this is deemed to be suitable, it is also possible for more or less gradually varying thickness to be installed in one or both measuring arms 410, 420 by appropriately adding additional material.

Figure 4C:
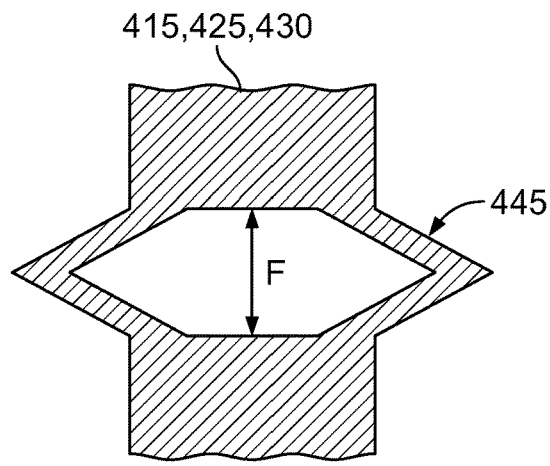
FIG. 4C is a sectional schematic view of an actuator element of a measuring element according to an embodiment.

One or more control members 445, i.e. actuator elements, as shown in FIG. 4C, are provided in order to controllably achieve an elongation/contraction in a certain region of the measuring element 400. For example, the one or more actuator elements 445 can be provided in the transition region 415 and/or the transition region 425 and/or in the deformation section 430, in order thus to controllably adjust the mechanical state of the measuring element 400. As shown in FIG. 4A, for example, a region of the transition region 425 is provided with one or more actuator elements 445, so that a change in the total thickness 404 is achieved when the elongation/contraction of the actuator element 445 is altered. In an embodiment, the total thickness 404 of the measuring arms can be altered from 0.001 to 2.0 mm. In a similar manner, the one or more actuator elements 445 can be provided in the transition region 415 and/or the deformation section 430 in order to thereby controllably adjust the total thickness 404, for example. The one or more actuator elements 445 are in this case any suitable control elements which perform a corresponding elongation/contraction, for example on the basis of an electrical signal and which must be held in a corresponding state. Among corresponding control members are piezo-electrical elements, controllable elements based on microelectronic mechanical systems (MEMS), micromotors, suitable metals or other materials that possess, for example, a well-reproducible heat expansion, and the like. A control member can also be provided in the form of a spindle driven by a revolving cylinder engine, or also manually.

A desired mechanical state of the one or more actuator elements 445, and thus of the measuring element 400, can thus be adjusted by applying a suitable control signal in the form of an electrical signal, a manual action, a signal that adjusts a reproducible temperature in the actuator element 445, an optical signal, and the like. This can alter the total thickness 404 within a desired range, without thereby having to alter the point of action of the force component which is to be measured. A corresponding "adjustment" of the total thickness 404 can also take place dynamically during the measuring process, by the one or more actuator elements 445 being correspondingly triggered when the measuring force exerts its effect. This can lead to a changed deformation in the section 430, because the force component to be measured thus exerts an effect on a system of measuring arms, which in the unstressed state would have a changed total thickness 404. Naturally, the change of the mechanical state of the one or more actuator elements 445 can also take place prior to a direct contact of an object which is to be measured.

Besides the dynamic and static adaptation of the configuration of the measuring element 400 through one or more actuator elements 445, the one or more actuator elements 445 can, in embodiments, be used as a sensor, by obtaining the stroke or the deflection and/or applied work of the actuator element 445 as information and involving it for further evaluation. This information can be obtained for instance by determining the number of revolutions of a revolving cylinder engine, by evaluating the control voltage of an element which reacts to voltage, and the like. The triggering of the actuator element 445 and thus the signal which is to be evaluated can for instance be altered until a given signal of the transformer unit(s) is achieved. Through this "compensation" of the signal of the transformer unit, the signal of the actuator element 445 is then an exact measure of the force which is to be measured. This compensation method can also be used to calibrate the measuring element 400 without requiring further calibration components. In other words, the actuator element 445 is activated until the desired calibration value, for instance a desired zero point, is adjusted in the transformer unit. That triggering signal of the actuator element 445 which is required for this calibration value can be applied during the actual measurement or appropriately taken into account during the evaluation.

Figure 5:
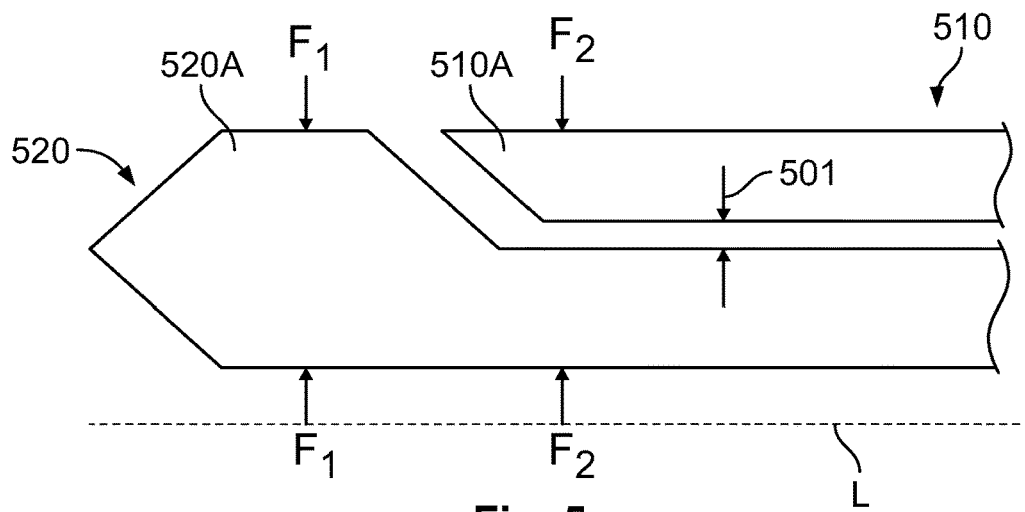
FIG. 5 is a side view of a pair of measuring arms according to another embodiment.

A part of measuring arms 510 and 520, as shown in FIG. 5, can be employed in this form in all previously described measuring elements 100, 200, 400 and also in all further described measuring elements. As shown in FIG. 5, the first measuring arm 510 and the second measuring arm 520 possess different dimensions in the longitudinal direction L, so that in this embodiment the second measuring arm 520, for example, has a front region 520A that fully encompasses a front region 510A of the first measuring arm 510 in the longitudinal direction L. In other words, the corresponding spacing 501 between the first measuring arm 510 and the second measuring arm 520 in the unstressed state is not formed entirely to the front, but the total thickness in the unstressed state is substantially identical over the entire extent of the measuring arms along the longitudinal direction L. In other words, through the system of measuring arms 510, 520 there arises a region which is insensitive to a force F1 which is exerting an effect, i.e. to a pair of forces which exerts an effect in the area of the front region 520A, whereas there is a desired sensitivity to a pair of forces F2 in the area of the first measuring arm 510. Thus in a measurement object, for example a plug connection, it is possible for a position to be set up, in which for instance a force component which is to be measured must be measured in a region which is set back further, while the insensitive front region 520A suitably enables a realistic modelling of the actual force conditions in the plug contact. For example, in situations in which spring forces from plug connections occur at different positions along the longitudinal direction L, the important region which is to be measured can possibly be situated at a set-back location, while on the other hand the conditions must be modelled as identically as possible to the actual factors. In this manner, the force component arising at the set-back position is measured without giving rise to a falsification through the spring forces which arise in the front region, but which are present in reality and influence the overall behavior.

In the case of measuring elements without this passive tip, as has been described previously for instance, only the total force F1+F2 can be measured in the constellation of forces F1, F2 shown in FIG. 5. If both forces are meant to be ascertained, such a measuring element, for example, can be additionally used in order to measure this total force in a further measuring process. From the two measurement results, i.e. from F2, which is determined with the measuring element 500, and F1+F2; which can be determined with the further measuring element without a passive tip, it is then possible to ascertain F1 by calculation.

Figure 6:
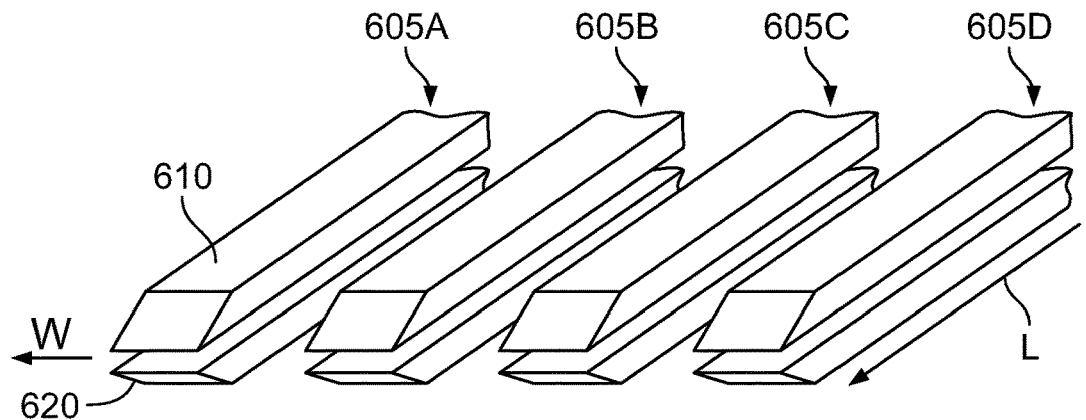
FIG. 6 is a perspective view of a plurality of pairs of measuring arms according to an embodiment.

In an embodiment shown in FIG. 6, measuring arm systems 605A, 605B, 605C, 605D each have a first measuring arm 610 and a second measuring arm 620. Here too, it should be noted that the measuring arm systems 605A, . . . , 605D shown in FIG. 6 can be employed in conjunction with any of the previously described measuring elements 100, 200, 400 and measuring elements which are still to be described. In the depicted embodiment, several measuring arm systems, for example with two, three, four or more measuring arm systems, are therefore arranged in a lateral direction W perpendicular to the longitudinal direction L, so that a contact of several of the measuring arm systems 605A, . . . , 605D with a respective force component which is to be measured can take place simultaneously. In an application example, for instance, a plug connection with several mechanical independent plug-in elements is charted with regard to the respective contact forces. For this purpose, the spacings in the lateral direction W are selected such that a correspondence to the respective lateral spacings in the measurement is achieved. In advantageous embodiments, each of the measuring arm systems 605A, . . . , 605D is mechanically coupled to an assigned separate deformation section, wherein the corresponding deformation section may be designed as described in connection with the measuring elements 100, 200, 400. In this manner, the individual force components registered in the respective measuring arm systems 605A, . . . , 605D can be output to an appropriate evaluation unit as a signal and evaluated separately. If required, the individual forces to be measured may possibly be added together during the evaluation in order to thus obtain a total force. If a "mechanical" addition of two or more force components is desired, corresponding two or more measuring arm systems 605A, . . . , 605D can exert an effect on a single deformation section in order to thus ascertain the corresponding sum force.

The following approach is adopted in the case of plug-in contacts with many parallel contact points: a narrow measuring element and large passive metal part, which presses the other springs on, is inserted because the entire spring formation is interrelated and only acts dependently. It is then necessary to insert many different passive metal parts in order to separate the forces. If it is desired to measure the force upon initial insertion, this is only possible with several parts. However, this approach is frequently not permissible according to the test regulations. Furthermore, a plug-in contact wears out when it is plugged in a number of times. The separated forces from several measurements thus never indicate the same situation with regard to ageing. Arranging the measuring arm systems 605A, . . . , 605D in parallel, with the possibility of simultaneous measurement, allows these disadvantages to be avoided.

Figure 7:
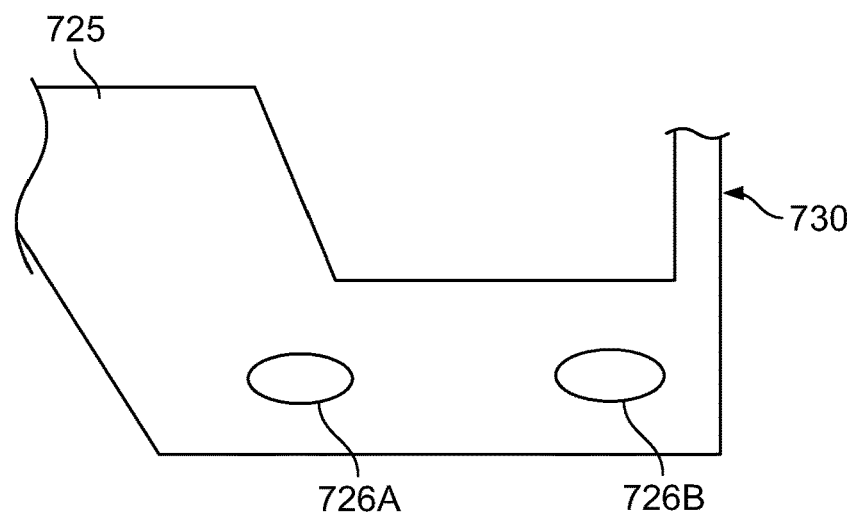
FIG. 7 is a side view of a part of a measuring element according to another embodiment.

A part of a connection region 725 is shown in FIG. 7, which is coupled with a measuring arm which is not shown. A part of a deformation section 730 is ultimately coupled to the measuring arm, not shown, via the connection region 725. In the embodiment shown in FIG. 7, this can be combined with all measuring elements hitherto described and described below. The connection region 725 in particular is suitably designed such that a high degree of response sensitivity, resolution and exactness is achieved, for example by providing appropriate cavities or material inserts 726A, 726B. In this manner, it is for example possible to notably abide by the criteria of the measuring system analysis corresponding to method 1 and method 3, i.e. for example for automated measuring systems. As has already been explained, appropriate simulation calculations can also be performed taking into account the one or more connection regions 725, in order to adapt the mechanical behavior of the measuring element notably to the corresponding application, so that in particular the criteria of the measuring system analysis can be fulfilled. In this manner, there also arises the possibility that the measurement results obtained by the measuring element according to the invention can be used to standardize or at least to exactly classify the quality and the behavior of the measuring objects.

Figure 8A:
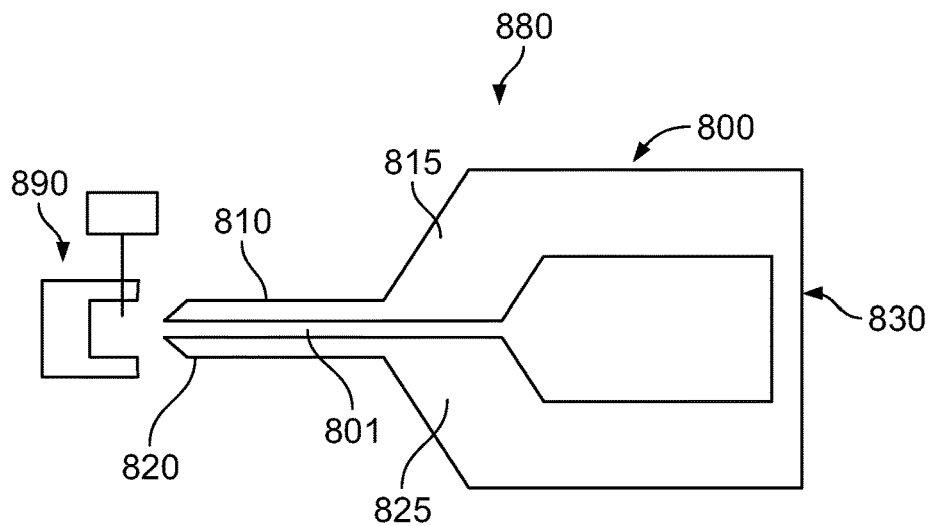
FIG. 8A is a side view of a measuring system according to another embodiment.

A measuring system 880 according to another embodiment is shown in FIG. 8A. The measuring system 880 comprises a measuring element 800 with a first measuring arm 810, a second measuring arm 820 which, in the unstressed state, form a spacing 801 therebetween, and with a deformation section 830, which is mechanically coupled to the measuring arms 810, 820 via corresponding connection regions 815, 825. The same criteria apply with regard to the measuring element 800 as have already been described for the respective embodiments. In other words, the measuring element 800 can be installed in the same manner as the measuring element 100 or the measuring element 200 or the measuring element 400 or can also be installed such that one or more features of one of the measuring elements in the preceding embodiments are combined in the measuring element 800. It is in particular also the case for the measuring arms 810, 820 that they are suitably formed as also described in the preceding embodiments. The same applies to the connection regions 815, 825 and to the deformation section 830. In other words, in embodiments, the measuring element 800 is, with an optimized geometric design, for example on the basis of simulation calculations, suitably adapted to the respective application and/or there are several measurement ranges realized in the element 800 and/or different values are realized for the total thickness of the system made up of measuring arms 810, 820 in the element 800 and/or the measuring arms 810, 820 are firmly connected to one another on one side and/or the cross-sectional shapes of the measuring arms 810, 820 are designed as described previously in connection with FIGS. 3A-3D and/or the measuring arms 810, 820 are designed as explained in relation to FIG. 5 and/or there are several measuring arm systems provided, as is explained for example in connection with FIG. 6. In the same manner, the connection regions 815, 825 can be structured as described in connection with FIG. 7.

The system 800, as shown in FIG. 8A, further comprises a calibration unit 890 which is provided in one embodiment as a separate component and that, in addition or alternatively, is installed as a component integrated in the measuring element 800 in a further embodiment.

Figure 8B:
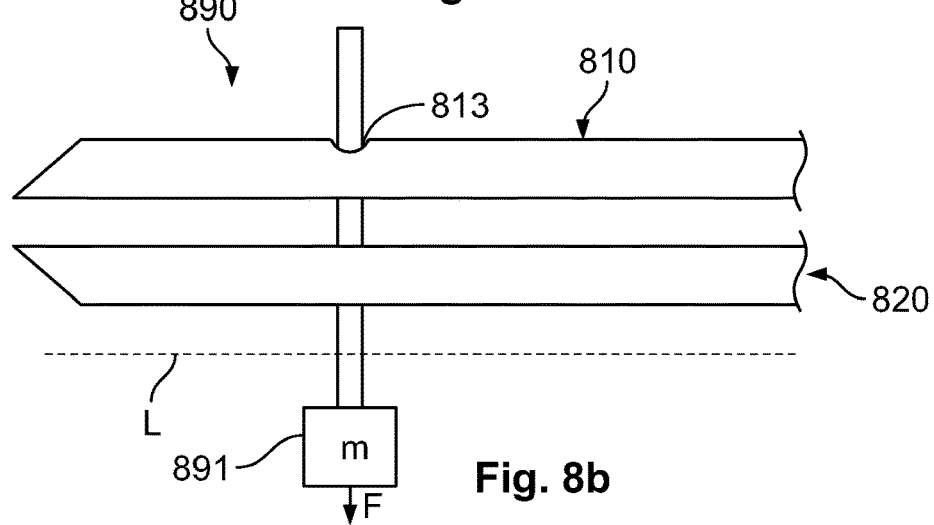
FIG. 8B is a side view of a calibration unit of the measuring system of FIG. 8A.

The calibration unit 890 in an embodiment is shown in FIG. 8B in which it is integrated in the element 800, for example in the form of a positioning element 813 which is provided at a precisely specified position along the longitudinal direction L at the first measuring arm 810 and/or the second measuring arm 820. The positioning element 813 is provided in any suitable form, for example in the form of a relief or depression, in order to thus receive a support of a positioning weight 891 which is exactly positioned in the longitudinal direction L. For this purpose, the measuring element 800 for example is oriented such that its measuring arms 810, 820 are arranged horizontally, as a result of which, when the calibration mass 891 is applied, a force component acting perpendicularly to the longitudinal direction L occurs at a precisely specified position, i.e. the position of the positioning element 813, so that it is possible to calibrate the response behavior of the deformation section 830 through the known size of the calibration force 891. In other variants, a calibration length element, which is not shown, is applied in order to cause a precisely defined deflection which is then used to calibrate the deformation section 830. Both variants can also be employed together.

Figure 8C:
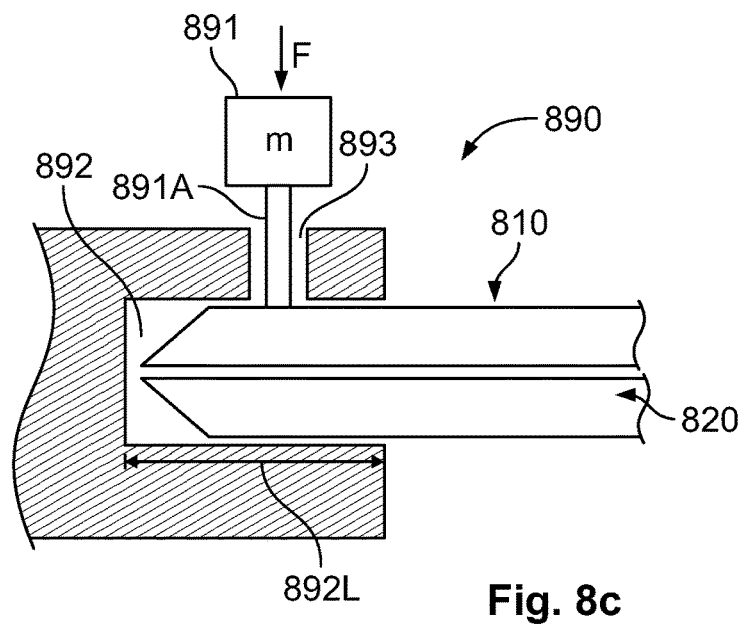
FIG. 8C is a side view of a pair of measuring arms of the measuring system of FIG. 8A positioned in the calibration unit.

In another embodiment of the calibration unit 890, shown in FIG. 8C, the calibration unit 890 is provided as a separate component. The calibration unit 890 has a cap shape or a cup shape in which there is formed a recess 892 such that the first and second measuring arms 810, 820 can be introduced in a precisely defined manner. For this purpose, the recess 892 possesses a suitable width, i.e. a dimension in the direction perpendicular to the plane of projection of FIG. 8c, and a suitable thickness, i.e. a suitable dimension in the direction perpendicular to the longitudinal direction L and in particular has a given length dimension 892L, so that when the measuring arm system strikes the rear edge of the recess 892, a precisely defined length of the measuring arm system is introduced into the recess 892. This cap can be understood as a calibration length element because a precisely defined deflection is caused. In addition or alternatively, the calibration unit 890 has an aperture 893 which is positioned precisely along the longitudinal direction L so that a calibration force 891, for instance in the form of a weight, can exert an effect on the measuring arm through the aperture 893 via an appropriate pressure rod 891A. As a result, the position of the point of action and the size of the measuring force 891 are precisely known and can thus also be used to calibrate the measuring element 800.

For all described embodiments, a suitable support or a housing is provided for the measuring element, so that a mechanically robust arrangement is obtained. For the sake of simplicity, such a housing is not shown. Furthermore, appropriate electronic, optoelectronic, micromechanically electronic components and the like, which can serve to acquire signals, evaluate signals or prepare signals, can be accommodated partially or fully at a suitable location in the measuring element itself and/or in an appropriate housing at a suitable location. For example, suitable semiconductor chips or other suitable substrates with optical, electronic, mechanical components, which are assembled thereon can be accommodated at a suitable location and also the respective supply lines are suitably provided in the form of wires, conductive paths, and the like at suitable locations in the measuring element and/or the housing. In other words, significant steps of a corresponding evaluation of signals can be performed in the measuring element or in an associated housing itself, and an appropriately prepared signal can be transmitted to a further electronic evaluation system, for instance a computer, and the like. In other variants, only substantially unprocessed signals are transmitted to the electronic evaluation system. A transmission of signals can take place for example through wired connections or also through wireless communication channels such that a high degree of flexibility is achieved in particular when a measuring system is applied with the measuring element according to the invention.

What is claimed is:

1. A measuring element for registering forces, comprising:
   a first measuring arm extending in a longitudinal direction of the measuring element;
   a second measuring arm extending in the longitudinal direction, the first measuring arm and the second measuring arm can be deflected relative to one another in a direction perpendicular to the longitudinal direction;
   a deformation section connecting the first measuring arm and the second measuring arm to one another in an elastically deformable manner, the deformation section having a first side facing the first measuring arm and second measuring arm and a second side facing away from the first measuring arm and the second measuring arm;
   a transformer unit arranged on the first side or the second side of the deformation section, the transformer unit responds to deformation and is situated fully within the deformation section; and
   an actuator element with an adjustable elongation or contraction disposed in at least one of a first connection region coupled with the first measuring arm, a second connection region coupled with the second measuring arm, and the deformation section.

2. The measuring element according to claim 1, further comprising a plurality of transformer units arranged on the first side and/or the second side of the deformation section and which each respond to deformation.

3. The measuring element according to claim 1, wherein a geometric design of the deformation section is modelled by simulating a deformation behavior for a given range of forces through relative deflection of the first measuring arm and the second measuring arm.

4. The measuring element according to claim 3, wherein the transformer unit is located in a region of the deformation section ascertained through simulation and/or in a region of the deformation section with a locally highest deformation.

5. The measuring element according to claim 1, wherein in a first measurement range, when a force that is to be measured through relative deflection of the first measuring arm and the second measuring arm and which is the same or smaller than a first threshold exerts an effect, the first measuring arm and the second measuring arm remain spaced apart from one another.

6. The measuring element according to claim 5, wherein in a second measurement range, when a force that is to be measured through relative deflection of the first measuring arm and the second measuring arm and which is greater than the first threshold exerts an effect, a front region of the first measuring arm is in contact with a front region of the second measuring arm.

7. The measuring element according to claim 6, wherein in a third measurement range, when a force that is to be measured through relative deflection of the first measuring arm and the second measuring arm and which is greater than the first threshold and equal to or greater than a second threshold that is above the first threshold exerts an effect, the front region of the first measuring arm is in contact with the front region of the second measuring arm and a size of an intermediate space formed by a rear region of the first measuring arm and a rear region of the second measuring arm is characteristic of the force that is to be measured.

8. The measuring element according to claim 7, further comprising a first detecting device adapted to register the contact of the front region of the first measuring arm with the front region of the second measuring arm.

9. The measuring element according to claim 8, further comprising a second detecting device adapted to register the size of the intermediate space.

10. The measuring element according to claim 1, wherein a first surface of the first measuring arm is opposite a second surface of the second measuring arm, the first surface and the second surface are formed complementary to one another and each have a surface region with a surface normal that forms an angle to the relative deflection.

11. The measuring element according to claim 1, wherein a total thickness of the first measuring arm and the second measuring arm, in a state without a force which is to be measured being exerted, is varied and/or variable at least in an interaction region of the first measuring arm and the second measuring arm.

12. The measuring element according to claim 11, wherein the total thickness varies in a range of +/−200 µm.

13. The measuring element according to claim 11, wherein the interaction region has at least three regions, each region having a different total thickness.

14. The measuring element according to claim 1 wherein a total thickness of the first measuring arm and/or the second measuring arm is adjustable by the actuator element in a range from 0.2 mm to 2.0 mm.

15. The measuring element according to claim 1 wherein the actuator element is able to be used as a sensor for providing a signal for evaluation and/or calibration.

16. The measuring element according to claim 1, further comprising a positioning element disposed at the first measuring arm and/or the second measuring arm, the positioning element is adapted to position a calibration mass or a calibration length element.

17. A measuring element for registering forces, comprising:
a first measuring arm extending in a longitudinal direction of the measuring element;
a second measuring arm extending in the longitudinal direction, the first measuring arm and the second measuring arm can be deflected relative to one another in a direction perpendicular to the longitudinal direction; and
a deformation section connecting the first measuring arm and the second measuring arm to one another in an elastically deformable manner, in a first measurement range when a force that is to be measured through relative deflection of the first measuring arm and the second measuring arm and which is the same or smaller than a first threshold exerts an effect, the first measuring arm and the second measuring arm remain spaced apart from one another, and in a second measurement range when the force that is to be measured through relative deflection of the first measuring arm and the second measuring arm and which is greater than the first threshold exerts an effect, a front region of the first measuring arm is in contact with a front region of the second measuring arm.

18. The measuring element according to claim 17, wherein in a third measurement range, when a force that is to be measured through relative deflection of the first measuring arm and the second measuring arm and which is greater than the first threshold and equal to or greater than a second threshold that is above the first threshold exerts an effect, the front region of the first measuring arm is in contact with the front region of the second measuring arm and a size of an intermediate space formed by a rear region of the first measuring arm and a rear region of the second measuring arm is characteristic of the force that is to be measured.

19. The measuring element according to claim 18, further comprising a first detecting device adapted to register the contact of the front region of the first measuring arm with the front region of the second measuring arm.

20. The measuring element according to claim 19, further comprising a second detecting device adapted to register the size of the intermediate space.

21. The measuring element according to claim 17, further comprising a transformer unit arranged on the deformation section and adapted to respond to deformation.

22. The measuring element according to claim 21, wherein the transformer unit is arranged on a side of the deformation section which faces the first measuring arm and the second measuring arm.

23. The measuring element according to claim 17, wherein a geometric design of the deformation section is modelled by simulating a deformation behavior for a given range of forces through relative deflection of the first measuring arm and the second measuring arm.

24. The measuring element according to claim 21, wherein the transformer unit is arranged in a region of the deformation section having a greatest deformation.

25. The measuring element according to claim 17, wherein a first surface of the first measuring arm is opposite a second surface of the second measuring arm, the first surface and the second surface are formed complementary to one another and each have a surface region with a surface normal that forms an angle to the relative deflection.

26. The measuring element according to claim 17, wherein a total thickness of the first measuring arm and the second measuring arm, in a state without a force which is to be measured being exerted, is varied and/or variable at least in an interaction region of the first measuring arm and the second measuring arm.

27. The measuring element according to claim 26, wherein the total thickness varies in a range of +/−200 μm.

28. The measuring element according to claim 26, wherein the interaction region has at least three regions, each region having a different total thickness.

29. The measuring element according to claim 17, further comprising an actuator element with an adjustable elongation or contraction disposed in at least one of a first connection region coupled with the first measuring arm, a second connection region coupled with the second measuring arm, and the deformation section.

30. The measuring element according to claim 29, wherein a total thickness of the first measuring arm and/or the second measuring arm is adjustable by the actuator element in a range from 0.2 mm to 2.0 mm.

31. The measuring element according to claim 29, wherein the actuator element is able to be used as a sensor for providing a signal for evaluation and/or calibration.

32. The measuring element according to claim 17, further comprising a positioning element disposed at the first measuring arm and/or the second measuring arm, the positioning element is adapted to position a calibration mass or a calibration length element.

33. A measuring element for registering forces, comprising:
 a first measuring arm extending in a longitudinal direction of the measuring element and having a front region and a rear region;
 a second measuring arm extending in the longitudinal direction and having a front region and a rear region, the rear regions of the first measuring arm and the second measuring arm can be deflected relative to one another in a direction perpendicular to the longitudinal direction and the front regions of the first measuring arm and the second measuring arm are firmly connected to one another; and
 a detecting device adapted to register a size of an intermediate space formed by the rear regions of the first measuring arm and the second measuring arm.

34. The measuring element according to claim 33, wherein the detecting device includes a transformer unit adapted to respond to deformation of the rear region of the first measuring arm and/or the second measuring arm.

35. The measuring element according to claim 33, wherein the first measuring arm and the second measuring arm are elastically coupled with one another on a side facing away from the front regions.

36. The measuring element according to claim 35, wherein the first measuring arm and the second measuring arm are elastically coupled by a deformation section.

37. The measuring element according to claim 36, wherein the deformation section has a transformer unit adapted to register a deformation of the deformation section.

38. A measuring system for registering forces, comprising:
 a measuring element including a first measuring arm extending in a longitudinal direction of the measuring element, a second measuring arm extending in the longitudinal direction, the first measuring arm and the second measuring arm can be deflected relative to one another in a direction perpendicular to the longitudinal direction, a deformation section connecting the first measuring arm and the second measuring arm to one another in an elastically deformable manner, the deformation section having a first side facing the first measuring arm and second measuring arm and a second side facing away from the first measuring arm and the second measuring arm, and a transformer unit arranged on the first side or the second side of the deformation section, the transformer unit responds to deformation and is situated fully within the deformation section; and
 a calibration unit adapted to be coupled with the measuring element and which, in a coupled state, fixes a position at the first measuring arm and/or the second measuring arm to be loaded with a calibration mass or to apply a calibration length element.

39. A measuring element for registering forces, comprising:
 a first measuring arm extending in a longitudinal direction of the measuring element;
 a second measuring arm extending in the longitudinal direction, the first measuring arm and the second measuring arm can be deflected relative to one another in a direction perpendicular to the longitudinal direction, a total thickness of the first measuring arm and the second measuring arm, in a state without a force which is to be measured being exerted, is varied and/or variable at least in an interaction region of the first measuring arm and the second measuring arm, the interaction region has at least three regions, each region having a different total thickness;
 a deformation section connecting the first measuring arm and the second measuring arm to one another in an elastically deformable manner, the deformation section having a first side facing the first measuring arm and second measuring arm and a second side facing away from the first measuring arm and the second measuring arm; and
 a transformer unit arranged on the first side or the second side of the deformation section, the transformer unit responds to deformation and is situated fully within the deformation section.

40. A measuring element for registering forces, comprising:
 a first measuring arm extending in a longitudinal direction of the measuring element;
 a second measuring arm extending in the longitudinal direction, the first measuring arm and the second measuring arm can be deflected relative to one another in a direction perpendicular to the longitudinal direction;
 a deformation section connecting the first measuring arm and the second measuring arm to one another in an elastically deformable manner, the deformation section having a first side facing the first measuring arm and second measuring arm and a second side facing away from the first measuring arm and the second measuring arm;
 a transformer unit arranged on the first side or the second side of the deformation section, the transformer unit responds to deformation and is situated fully within the deformation section; and
 a positioning element disposed at the first measuring arm and/or the second measuring arm, the positioning element is adapted to position a calibration mass or a calibration length element.

* * * * *